(12) United States Patent
Uchikawa

(10) Patent No.: US 11,689,647 B2
(45) Date of Patent: Jun. 27, 2023

(54) COMMUNICATION APPARATUS, CONTROL METHOD, AND STORAGE MEDIUM

(71) Applicant: CANON KABUSHIKI KAISHA, Tokyo (JP)

(72) Inventor: Shinichi Uchikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/408,249

(22) Filed: Aug. 20, 2021

(65) Prior Publication Data
US 2022/0070283 A1    Mar. 3, 2022

(30) Foreign Application Priority Data

Aug. 27, 2020  (JP) .............................. JP2020-143831

(51) Int. Cl.
| | |
|---|---|
| *H04L 43/16* | (2022.01) |
| *H04L 69/16* | (2022.01) |
| *H04L 69/166* | (2022.01) |
| *H04L 43/028* | (2022.01) |
| *H04L 69/24* | (2022.01) |
| *H04L 69/163* | (2022.01) |

(52) U.S. Cl.
CPC .......... *H04L 69/166* (2013.01); *H04L 43/028* (2013.01); *H04L 69/163* (2013.01); *H04L 69/24* (2013.01)

(58) Field of Classification Search
None
See application file for complete search history.

(56) References Cited

U.S. PATENT DOCUMENTS

| | | | | |
|---|---|---|---|---|
| 6,973,097 B1* | 12/2005 | Donzis | ................. | H04W 80/04 370/470 |
| 2008/0101382 A1* | 5/2008 | Bannerjee | ............... | H04L 47/10 370/395.52 |
| 2012/0198090 A1* | 8/2012 | Saito | ....................... | H04L 49/90 709/236 |

(Continued)

OTHER PUBLICATIONS

Web, CVE-2019-11478 Detail; https://nvd.nist.gov/vuln/detail/CVE-2019-11478, 12 pages, accessed Jul. 9, 2020.

*Primary Examiner* — Duc T Duong
(74) *Attorney, Agent, or Firm* — Canon U.S.A., Inc. IP Division

(57) ABSTRACT

A communication apparatus that performs Transmission Control Protocol (TCP) communication, the communication apparatus includes at least one processor that executes a set of instructions, the instructions, when executed, causing the communication apparatus to perform operations includes setting a maximum segment size (MSS) lower limit value to be used in the TCP communication, based on a user operation, and executing, when an initiation request for the TCP communication is received from an external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication using the determined MSS.

13 Claims, 14 Drawing Sheets

(56) References Cited

U.S. PATENT DOCUMENTS

| | | | | |
|---|---|---|---|---|
| 2012/0250703 A1* | 10/2012 | Suzuki | ............... | H04L 69/164 |
| | | | | 370/474 |
| 2012/0281559 A1* | 11/2012 | Ner | ............... | H04W 28/06 |
| | | | | 370/252 |
| 2014/0169164 A1* | 6/2014 | Oguchi | ............... | H04L 47/193 |
| | | | | 370/230 |
| 2014/0301395 A1* | 10/2014 | Khanal | ............... | H04L 45/021 |
| | | | | 370/392 |
| 2015/0106530 A1* | 4/2015 | Alanen | ............... | H04L 45/24 |
| | | | | 709/231 |
| 2015/0350160 A1* | 12/2015 | Nathan | ............... | H04L 67/52 |
| | | | | 726/14 |
| 2015/0365503 A1* | 12/2015 | Sung | ............... | H04L 69/16 |
| | | | | 370/252 |
| 2016/0057067 A1* | 2/2016 | Jagadish | ............... | H04L 69/326 |
| | | | | 370/230 |
| 2016/0380902 A1* | 12/2016 | Sreeramoju | ............... | H04L 69/16 |
| | | | | 370/401 |
| 2017/0346753 A1* | 11/2017 | Wang | ............... | H04L 49/9005 |
| 2017/0359756 A1* | 12/2017 | Vangala | ............... | H04L 69/166 |
| 2021/0051112 A1* | 2/2021 | Wondra | ............... | H04L 12/4641 |
| 2021/0084125 A1* | 3/2021 | Sabin | ............... | H04L 69/22 |

* cited by examiner

FIG.4A

MSS (Maximum Segment Size) SETTINGS

· DESIGNATE MSS LOWER LIMIT VALUE

- 2010 ☐ AUTOMATIC
- 2011 ■ MANUAL    2012 [ 48 ]  2013 (48 – 1000)

· DEFENSE METHOD FOR OUT-OF-RANGE MSS

- 2020 ☐ FORCE    2021 ■ REJECT

2100 [ RETURN ]    2101 [ ENTER ]

SETTING ERROR: REVIEW SETTINGS.

```
# iptables -I INPUT -p tcp --tcp-flags SYN SYN -m tcpmss --mss 1:499 -j DROP
# ip6tables -I INPUT -p tcp --tcp-flags SYN SYN -m tcpmss --mss 1:499 -j DROP
```

FIG.11

MSS (Maximum Segment Size) SETTINGS

· DESIGNATE MSS LOWER LIMIT VALUE

☐ AUTOMATIC
■ MANUAL

[ 48 ] (48 ~ 1000)

· DEFENSE METHOD FOR OUT-OF-RANGE MSS

☐ FORCE    ■ REJECT

· NOTIFY ALERT WHEN COMMUNICATION USING OUT-OF-RANGE MSS IS ATTEMPTED

2030 ~ ☐ NOTIFY    2031 ~ ■ DO NOT NOTIFY

[ RETURN ]    [ ENTER ]

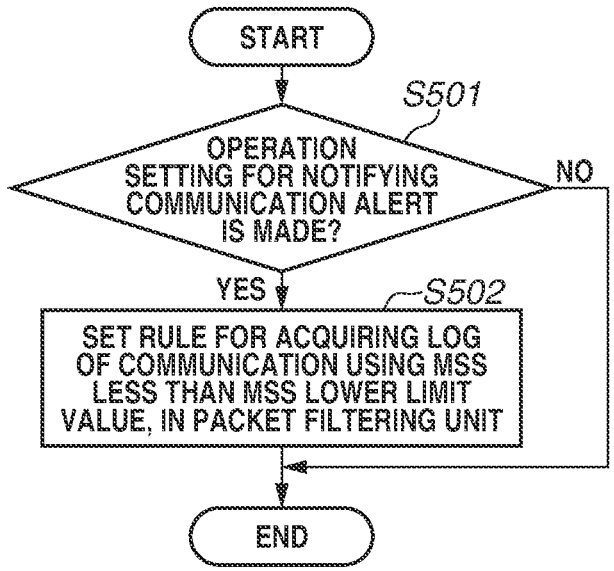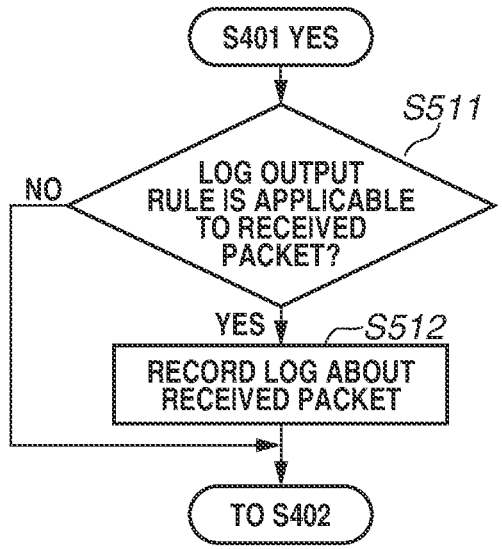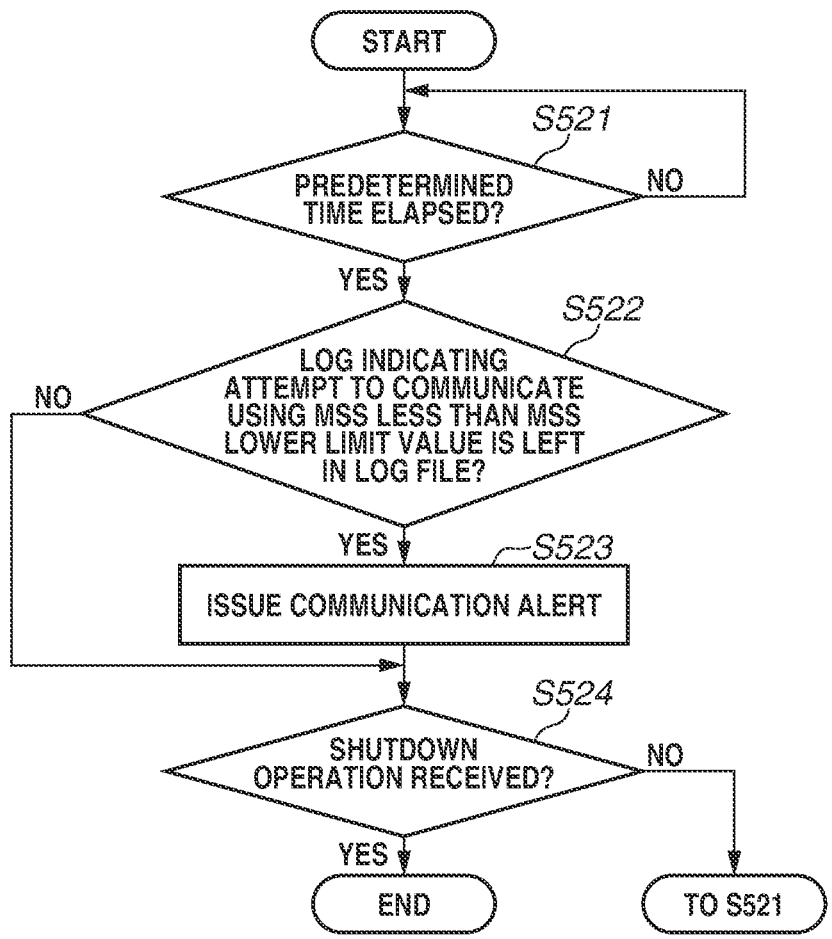

FIG.13

```
# iptables -I INPUT -p tcp --tcp-flags SYN SYN -m tcpmss --mss 1:499 -j LOG
# ip6tables -I INPUT -p tcp --tcp-flags SYN SYN -m tcpmss --mss 1:499 -j LOG
```

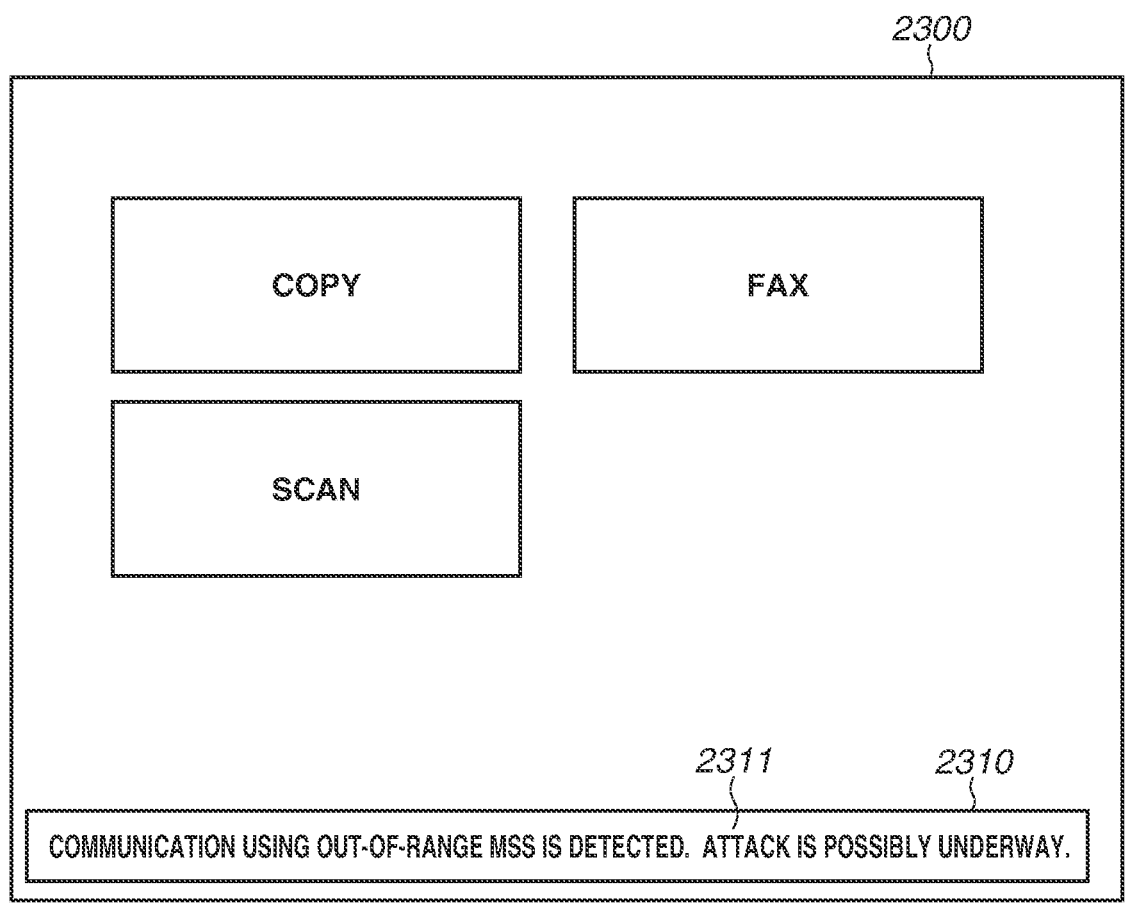

COMMUNICATION APPARATUS, CONTROL METHOD, AND STORAGE MEDIUM

BACKGROUND

Field of the Disclosure

The present disclosure relates to a communication apparatus that performs communication, a control method, and a storage medium.

Description of the Related Art

It has been known that in a case where Transmission Control Protocol (TCP) communication is performed between communication apparatuses, a maximum segment size (MSS) that is the maximum size of TCP segments to be exchanged is determined when the TCP communication is established.

Specifically, there is known a method in which between communication apparatuses, the apparatuses notify each other of respective acceptable MSSs, and a smaller value of the notified MSSs is determined as an MSS to be used in TCP communication. However, in recent years, vulnerability related to this determination of an MSS in TCP communication has been reported (CVE-2019-11478, https://nvd.nist.gov/vuln/detail/CVE-2019-11478).

An attack based on a technique exploiting the vulnerability can cause a denial of service or delays in service to a certain communication apparatus. For example, an attacking communication apparatus specifies a small MSS value, such as 50, and transmits TCP data divided using the MSS value to a target communication apparatus (can also be referred to as a partner apparatus). Subsequently, in the communication sequence, the attacking communication apparatus transmits an intentionally falsified selective acknowledgement (SACK), to deplete a reception buffer of the partner apparatus. The partner apparatus attacked using this technique can have a kernel panic caused by the depletion of the reception buffer, or a delay in service caused by the depletion of the reception buffer or resource management for the buffer. The attacking communication apparatus consumes resources of the partner apparatus and consequently causes a delay in service, by merely transmitting a large amount of TCP data divided into a small size as specified in the MSS.

Known methods to avoid this attack include a method of disabling a SACK function, and a control method of not establishing TCP communication with a communication apparatus that has notified an MSS less than a predetermined size.

To address the above-described vulnerability in communication apparatuses, a threshold (a lower limit value) can be set for determination of whether to impose some limitation on a TCP communication may be set. However, if such a threshold is adopted as a predetermined threshold at the time of, for example, designing communication apparatuses, the following issue may arise.

For example, if the lower limit value is excessively small, there is a possibility that an effect of protection against attacks is not obtained. On the other hand, if the lower limit value is excessively large, an effect of protection against attacks is appropriately obtained, but this value can also affect TCP communications desired to be established normally.

SUMMARY

In view of at least one of the above-described issues, according to an aspect of the present disclosure, the present disclosure is directed to providing a mechanism in which a lower limit value can be appropriately set based on a user environment for using a communication apparatus, via a setting screen for setting a lower limit value related to TCP communication. According to another aspect of the present disclosure, the present disclosure is directed to providing information for appropriately guiding a user in setting a lower limit value related to TCP communication.

According to an aspect of the present disclosure, a communication apparatus that performs Transmission Control Protocol (TCP) communication with an external apparatus, the communication apparatus includes at least one memory that stores a set of instructions, and at least one processor that executes the instructions, the instructions, when executed, causing the communication apparatus to perform operations includes setting a maximum segment size (MSS) lower limit value to be used in the TCP communication, based on a user operation, and executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS.

Further features of the present disclosure will become apparent from the following description of exemplary embodiments with reference to the attached drawings.

BRIEF DESCRIPTION OF THE DRAWINGS

FIGS. 4A and 4B are diagrams each illustrating an example of a setting screen of the communication apparatus.

FIG. 7 is a diagram illustrating an example of a rule for rejecting a packet.

FIG. 11 is a diagram illustrating an example of a setting screen of the communication apparatus according to the second exemplary embodiment.

FIGS. 12A to 12C are flowcharts each illustrating an example of control of the communication apparatus according to the second exemplary embodiment.

FIG. 13 is a diagram illustrating an example of a rule for acquiring a packet log.

FIG. 14 is a diagram illustrating an example of a notification according to the second exemplary embodiment.

DESCRIPTION OF THE EMBODIMENTS

Figure 1:
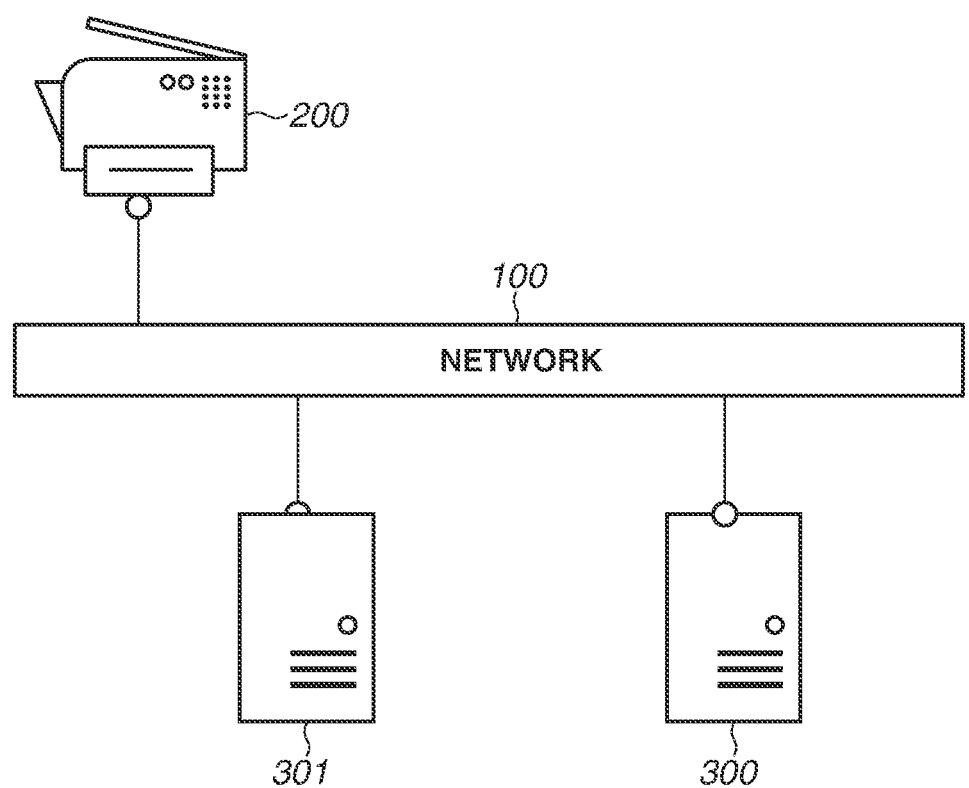
FIG. 1 is a diagram illustrating an example of a communication system.

A configuration of a communication system according to exemplary embodiments of the present disclosure will be described with reference to FIG. 1. In the communication system according to the present exemplary embodiment, a communication apparatus 200, a device 300, and a device 301 are connected to a network 100.

In a first exemplary embodiment, a multi-function peripheral (MFP) having a print function and a scan function is used as an example of the communication apparatus 200. However, a communication apparatus to which the present exemplary embodiment is applicable is not limited to the MFP. The present exemplary embodiment is also applicable to communication control of a single-function printing apparatus. Further, the present exemplary embodiment is also applicable to communication control in, for example, an IoT device, a personal computer (PC), an edge server, and a smartphone. Each of the device 300 and the device 301 is, for example, a file server, such as an information management server that manages information of the communication apparatus 200, or a server that provides a print service. However, the device 300 and the device 301 are not limited thereto, and each may be a server of a mission-critical system or a cloud server.

The communication apparatus 200 can transmit data based on a scanned image to an external apparatus, and can transmit data collected by the communication apparatus 200 to an external server. The communication apparatus 200 has a web server function, and can display operation settings of the communication apparatus 200 on a web browser of an external apparatus and can provide a web screen for receiving a change instruction.

Figure 2:
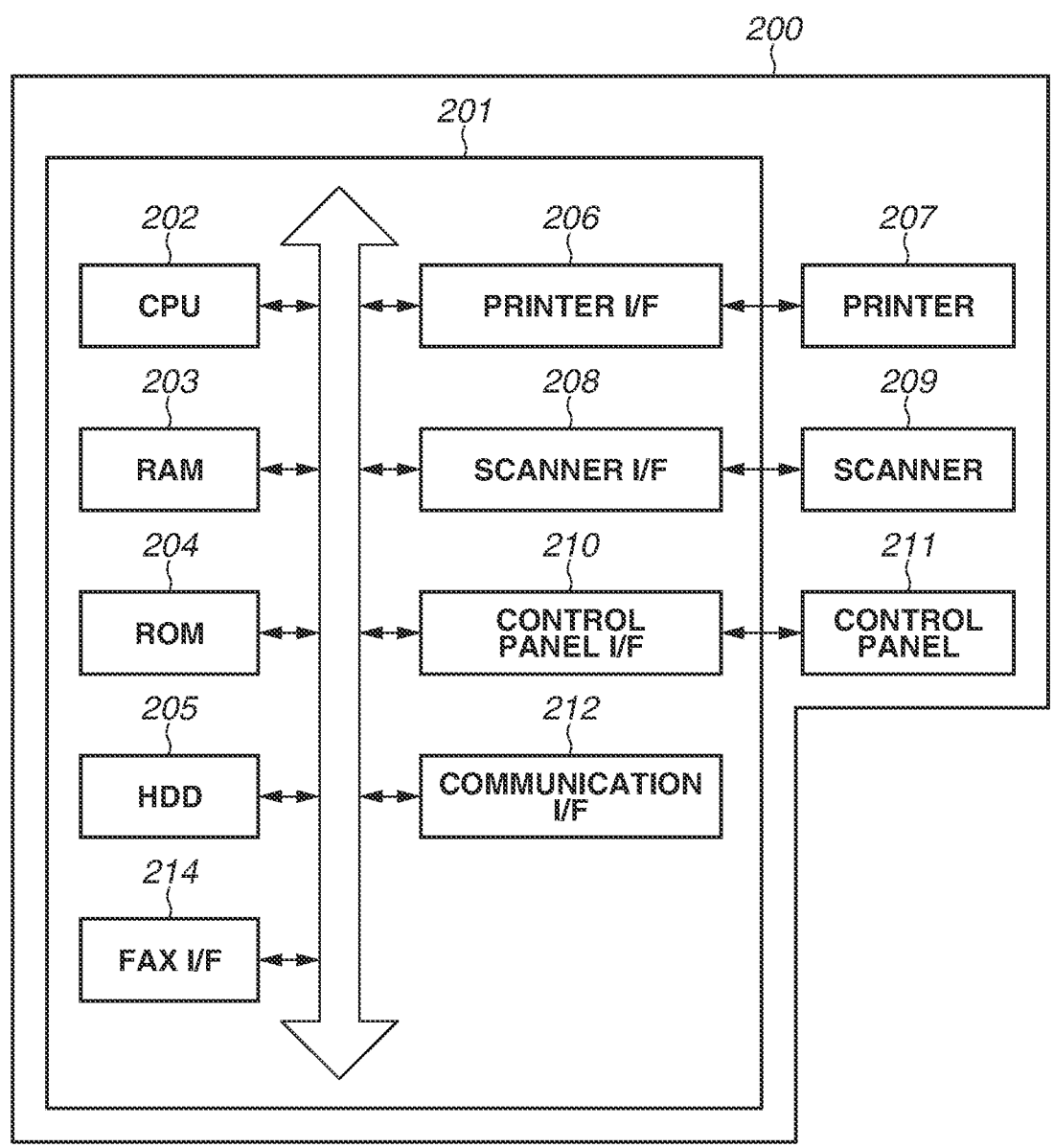
FIG. 2 is a diagram illustrating an example of a hardware configuration of a communication apparatus.

A configuration of the communication apparatus 200 will be described with reference to FIG. 2. FIG. 2 is a block diagram illustrating a hardware configuration of the communication apparatus 200. The communication apparatus 200 has functions, such as a reading function of reading an image on a sheet and a file transmission function of transmitting the read image to an external communication apparatus. The communication apparatus 200 also has a print function of printing an image on a sheet.

A control unit 201 includes a central processing unit (CPU) 202 and controls operation of the entire communication apparatus 200. A control program stored in a read only memory (ROM) 204 or a hard disk drive (HDD) 205 is loaded into a random access memory (RAM) 203. The CPU 202 reads out the control program loaded into the RAM 203 and performs various kinds of control, such as print control and reading control. The ROM 204 stores control programs executable by the CPU 202. The RAM 203 is a main storage memory of the CPU 202, and is used as a work area or a temporary storage area for loading various control programs. The HDD 205 is a nonvolatile storage area for storing print data, image data, various programs, and various settings information. In this way, hardware such as the CPU 202, the ROM 204, the RAM 203, and the HDD 205 forms a so-called computer.

In the communication apparatus 200 of the present exemplary embodiment, one CPU (the CPU 202) executes each step of processing in each flowchart to be described below, using one memory (the RAM 203), but other mode may be adopted. Each step of processing in each flowchart to be described below can be executed by, for example, a plurality of processors, memories, and storages operating in cooperation with each other. Part of the processing may be executed using a hardware circuit.

A printer interface (I/F) 206 connects a printer 207 (a printer engine) and the control unit 201. The printer 207 prints an image on a sheet fed from a feed cassette (not illustrated), based on print data input via the printer I/F 206. The printing method may be an electrophotographic method of transferring toner to paper and fixing the toner, or may be an inkjet method of printing by discharging ink to paper. The printer 207 may be a three-dimensional (3D) printer that generates a 3D-shaped output product using a molding material. In this case, print data indicates a 3D shape, and a 3D-shaped output product is generated using a molding material or a support material in place of a color material, such as toner or ink.

A scanner I/F 208 connects a scanner 209 and the control unit 201. The scanner 209 reads an original document placed on the scanner 209 and generates image data. The image data generated by the scanner 209 is printed by the printer 207, stored in the HDD 205, or transmitted to an external apparatus via a fax I/F 214 or a communication I/F 212. In the present exemplary embodiment, the scanner 209 of a type that reads an original document is used as an example, but the scanner 209 is not limited to this type. The scanner 209 may be a 3D scanner that reads shape data of a 3D object. In this case, the printer 207 serves as the above-described 3D printer. In the case where the scanner 209 is the 3D scanner, the scanner 209 generates shape data instead of generating image data. The generated shape data is transmitted to an external apparatus or used by the 3D printer to create a copy (a 3D copy) of the 3D object.

A control panel I/F 210 connects a control panel 211 and the control unit 201. The control panel 211 includes a liquid crystal display unit having a touch panel function, and various hardware keys. The control panel 211 serves as a display unit that displays information and a receiving unit that receives an instruction from a user. The CPU 202 controls information display and controls receipt of a user operation, in cooperation with the control panel 211.

A network cable having a RJ45 connector shape or a GigaGate45 (GG45) connector shape is connected to the communication I/F 212, so that communication with an external apparatus via a network can be executed. The communication apparatus 200 is connected to the network 100 via the communication I/F 212. The communication method is an example, and a communication method in a physical layer of the communication I/F 212 may be a wireless communication method compliant with a wireless communication standard based on the Institute of Electrical and Electronics Engineers (IEEE) 802.11 series.

Software Configuration of Communication Apparatus 200

An example of a software module of the communication apparatus 200 will be described with reference to FIG. 3. The communication apparatus 200 includes an operating system (OS) 1020, and middleware that operates in cooperation with the OS 1020.

First, each element of the OS 1020 will be described. The OS 1020 is system software that comprehensively manages the entire communication apparatus 200. Specifically, the OS 1020 performs basic management and control of a computer, such as input/output control, management of hardware, such as a memory and a hard disk, and management of a process. Further, the OS 1020 of the present exemplary embodiment includes a packet filtering unit 1021 and a protocol stack unit 1022.

The packet filtering unit 1021 provides a function called a firewall, and provides a packet filtering function of permitting or rejecting packet transmission based on a designated rule. The protocol stack unit 1022 is a module that performs a series of steps of control to implement Transmission Control Protocol/Internet Protocol (TCP/IP) communication. The protocol stack unit 1022 establishes TCP communication with an external apparatus, such as the device 300 or the device 301, by performing a three-way handshake, and performs maintenance and management of a communication session. The TCP communication is a communication method of establishing a connection with a communication partner (e.g., the device 300 or 301), and transmitting/receiving data via the established communication channel.

Next, the middleware will be described. A setting control unit 1010 is a module that displays a setting screen on the control panel 211, and receives a change of the operation settings of the communication apparatus 200 based on a user operation via the setting screen. Upon receiving a setting change operation, the setting control unit 1010 updates (changes) the setting in a setting value database (DB) 1011 based on the setting change operation.

Various operation settings of the communication apparatus 200 are stored in the setting value DB 1011. These settings are appropriately referred to or changed in processing of flowcharts to be described below. A maximum segment size (MSS) control unit 1040 is a module that reflects an MSS-related setting in each module of the OS 1020. An MSS lower limit value automatic setting unit 1050 is a module that performs processing of dynamically determining a lower limit value, in a case where an operation setting for automatically setting an MSS is made in a setting screen to be described below.

Setting of Lower Limit Value of MSS

Next, MSS settings in the present exemplary embodiment will be described with reference to FIG. 4. A setting screen 2000 illustrated FIG. 4A is an example of a setting screen displayed on the control panel 211 by the setting control unit 1010.

A user having administrator authority can set an MSS lower limit value to be permitted by the communication apparatus 200 for TCP communication, and a defense method (a restriction method) against communication requiring an MSS outside the set MSS range, via the setting screen 2000.

Keys 2010 and 2011 are display items for selecting whether the MSS lower limit value is to be set automatically or manually. One of the keys 2010 and 2011 is enabled and the other is disabled. The setting screen 2000 exemplifies a screen to be displayed in a case where the key 2011 is enabled, and a value "48" is set in a field 2012 as the MSS lower limit value.

The setting screen 2000 also displays information 2013 indicating an acceptable input range. The information 2013 is provided to notify the user that there are a lower limit value and an upper limit value that can be set.

In the communication apparatus 200 of the present exemplary embodiment, a setting is made to present a size of 1460 bytes obtained by excluding various headers from the maximum frame size to a partner as an MSS candidate, in view of an Ethernet (registered trademark) frame having a size of 1518 bytes at the maximum. This setting is stored in the setting value DB 1011.

Keys 2020 and 2021 are display items for selecting how to handle a case where a communication using an MSS lower than the MSS lower limit value, i.e., out of the range, is requested. One of the keys 2020 and 2021 is enabled, and the other is disabled. In the present exemplary embodiment, a case where the key 2021 is enabled is illustrated as an example.

When "force" indicated by the key 2020 is selected, and in a case where an MSS of a communication partner is less than the MSS lower limit value set in the communication apparatus 200, an operation setting for attempting establishment of TCP communication using the MSS designated as the MSS lower limit value in the field 2012 is set. In the present exemplary embodiment, "force" can include attempting a negotiation with a communication partner using the MSS lower limit value, and executing error exit from the communication in a case where the negotiation is refused by the communication partner.

When "reject" indicated by the key 2021 is selected, and in a case where an MSS of a communication partner is less than the MSS lower limit value set in the communication apparatus 200, an operation setting for executing control to reject the communication using the packet filtering unit 1021 is set.

In the present exemplary embodiment, the display item is a collective term for display objects including keys and buttons for receiving user operations, labels for displaying information, display areas, and drawing objects. A case where the setting screen is displayed on the control panel 211 of the communication apparatus 200 will be described below as an example, for the purpose of the description. However, the present exemplary embodiment is not limited thereto. The similar settings can also be set by accessing a web page provided by the web server function of the communication apparatus 200 from a web browser of a client terminal.

A key 2100 is used to cancel settings and transit to a screen in a level immediately above. A key 2101 is used to reflect a setting made via the setting screen 2000. In response to detection of pressing the key 2101, the setting control unit 1010 updates a setting value in the setting value DB 1011, based on each setting made via the setting screen 2000. These setting values are referred to as appropriate in processing of flowcharts to be described below.

Figure 5:
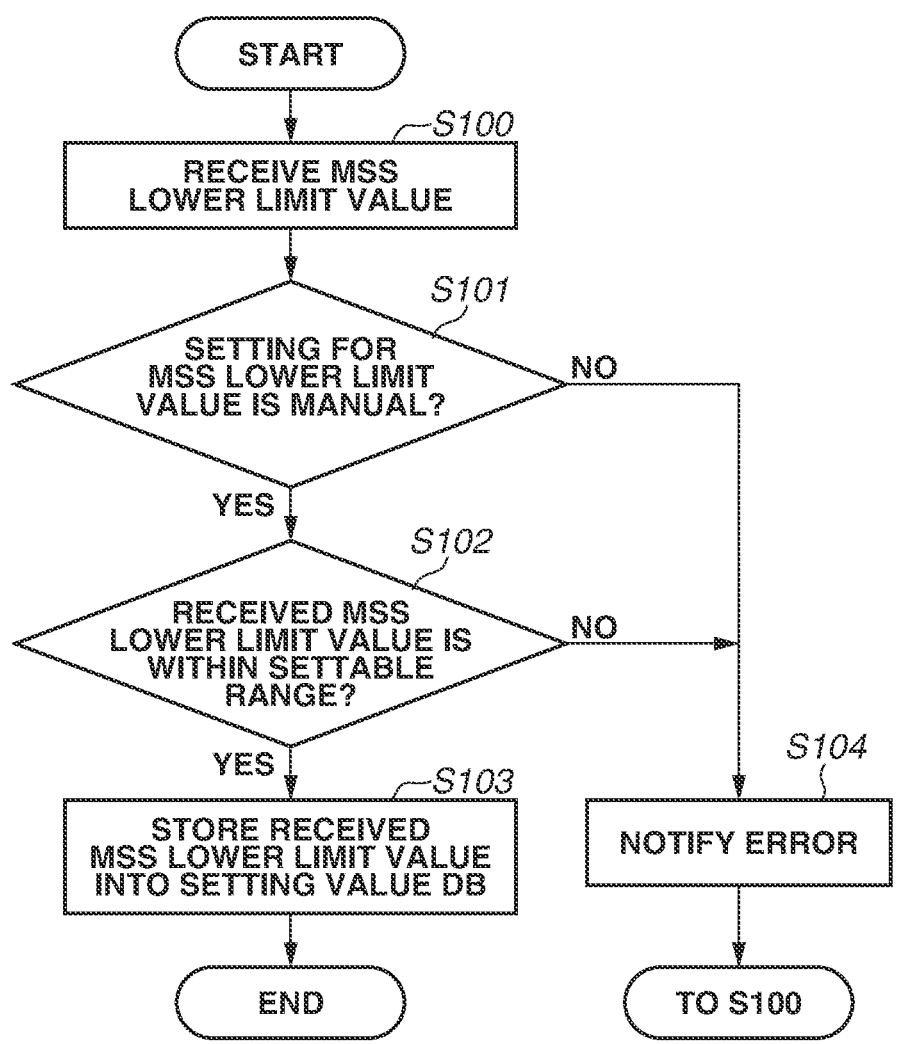
FIG. 5 is a flowchart illustrating an example of control of the communication apparatus.

Next, control of a manual setting of the MSS lower limit value will be described with reference to a flowchart in FIG. 5. FIG. 5 is a flowchart illustrating control of processing for receiving a setting value by the setting control unit 1010.

Figure 3:
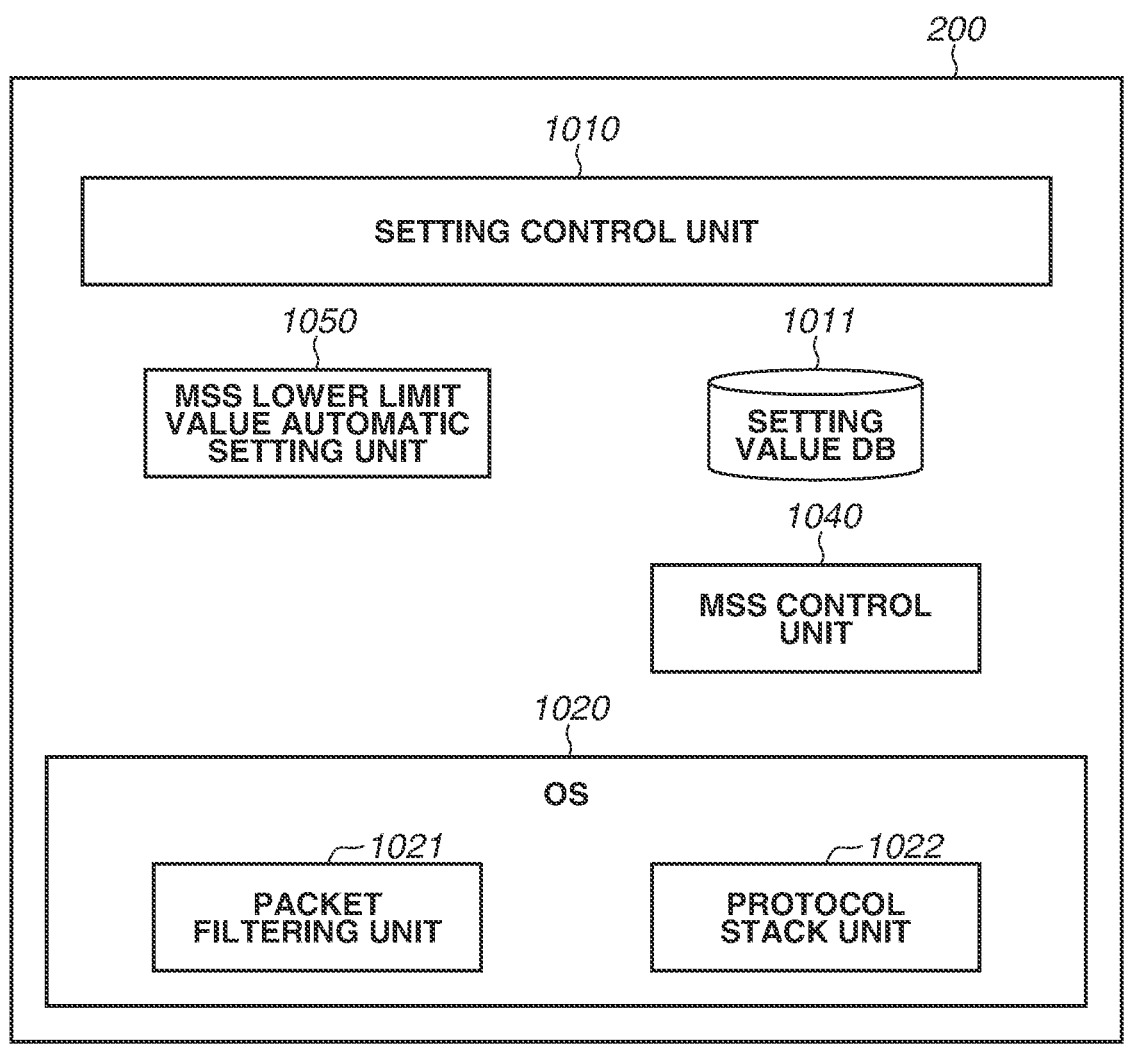
FIG. 3 is a diagram illustrating an example of a software configuration of the communication apparatus according to a first exemplary embodiment.

A program code for implementing each module (control unit) described with reference to FIG. 3 is read into the RAM 203 and executed by the CPU 202, so that operation illustrated in the flowchart in each of FIGS. 5, 6, 8, 9, and 12 is implemented. To clarify the subject of processing, the control unit serving as each software module will be used as the subject as appropriate in the description.

In step S100, the setting control unit 1010 receives the MSS lower limit value input in the field 2012 by an input operation, in cooperation with the control panel 211. Subsequently, in step S101, the setting control unit 1010 determines whether an operation setting indicating the way of determining the MSS lower limit value is the manual setting.

In a case where the operation setting is an automatic setting (NO in step S100), the processing proceeds to step S104 to execute error processing, without reflecting the received MSS lower limit value in the operation settings. In a case where the operation setting is the manual setting (YES in step S100), the processing proceeds to step S102.

In step S102, the setting control unit 1010 checks whether the MSS lower limit value received in step S100 is within an appropriate range. Specifically, the setting control unit 1010 acquires a settable range of the MSS lower limit value from the setting value DB 1011. In the present exemplary embodiment, a case where a range from 48 to 1000 is stored as the settable range at the time of factory shipment is described as an example. Subsequently, the setting control unit 1010 compares the received MSS lower limit value with the acquired settable range. As a result of the comparison, in a case where the received MSS lower limit value is determined to be within the acquired settable range (YES in step S102), the processing proceeds to step S103. In a case where the received MSS lower limit value is determined to be outside the acquired settable range (NO in step S102), the processing proceeds to step S104. In step S103, the setting control unit 1010 stores the MSS lower limit value received in step S100 into the setting value DB 1011, and the series of procedures of the processing ends.

In step S104, the setting control unit 1010 notifies the user of an error, in cooperation with the control panel 211. A pop-up window 2200 illustrated in FIG. 4B is an example of an error notification displayed in step S104, and includes a message for notifying the user of a setting error. When a user operation of closing the error notification is received by the setting control unit 1010, the processing returns to step S100, and the setting control unit 1010 waits for a further update operation to be made.

In the present exemplary embodiment, the case where the input MSS lower limit value can be received even in a case where the automatic setting is set for the operation setting indicating the way of determining the MSS lower limit value is described as an example, but the present exemplary embodiment is not limited thereto. For example, in a case where the automatic setting is set for the operation setting indicating the way of determining the MSS lower limit value, the display item in the field 2012 may be controlled to be in a gray-out state and in a state for receiving no input operation.

Even in a case where the input MSS lower limit value is within the settable range, a confirmation notification may be issued depending on a numerical value range where the input MSS lower limit value is in. For example, in a case where a value of 60 or less is received as the input MSS lower limit value, a confirmation message indicating a possibility of failing to obtain an effect of appropriate defense may be displayed. For example, in a case where a value of 900 or more is received as the input MSS lower limit value, a confirmation message indicating a possibility of failing to perform a TCP communication supposed to be performed normally may be displayed.

Figure 6:
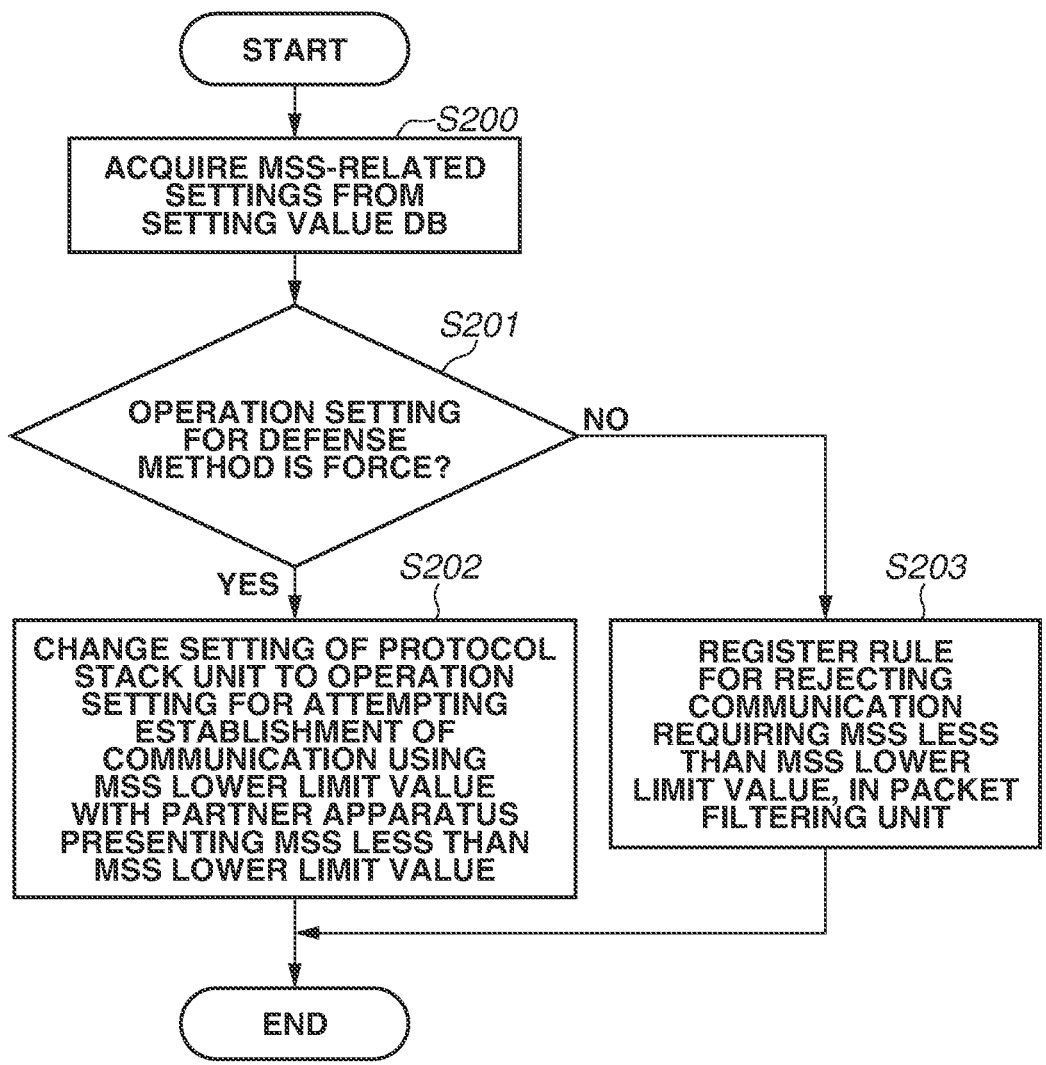
FIG. 6 is a flowchart illustrating an example of control of the communication apparatus.

Next, a method of controlling setting for the protocol stack unit 1022 based on the operation settings described with reference, to FIG. 4A and FIG. 5 will be described with reference to the flowchart in FIG. 6. FIG. 6 illustrates an example of communication control in a case where either "reject" indicated by the key 2021 or "force" indicated by the key 2020 is selected as the defense method against an MSS out of the range in the setting screen 2000. Each procedure of control illustrated in the flowchart in FIG. 6 is executed in a case where a change is made to the MSS-related settings illustrated in FIG. 4A, in a case where the communication apparatus 200 is powered on, in a case where a NW setting is changed, and in a case where the communication apparatus 200 returns from a sleep state.

In step S200, the MSS control unit 1040 acquires the MSS-related settings by referring to the setting value DB 1011. Here, the MSS lower limit value and the operation setting for the defense method are acquired.

Subsequently, in step S201, the MSS control unit 1040 determines whether the acquired operation setting for the defense method is "force". In a case where the acquired operation setting for the defense method is "force" (YES in step S201), the processing proceeds to step S202. In a case where the acquired operation setting for the defense method is "reject" (NO in step S201), the processing proceeds to step S203.

In step S202, the MSS control unit 1040 changes a setting of the protocol stack unit 1022 to the operation setting for attempting establishment of communication using the MSS lower limit value with a communication partner apparatus presenting an MSS less than the MSS lower limit value.

Communication control of the protocol stack unit 1022 in a case where the above-described setting is made will be described. In a case where an acceptable MSS candidate value presented by the communication partner is less than the MSS lower limit value set by the processing in step S202, the protocol stack unit 1022 attempts communication establishment using the MSS lower limit value. In other words, the protocol stack unit 1022 intentionally ignores the MSS candidate value presented by the communication partner and attempts establishment of communication using the MSS lower limit value greater than the MSS candidate value. In a case where a TCP communication with the communication partner is successfully established, the communication control is performed using the MSS lower limit value.

On the other hand, in a case where the MSS value presented by the communication partner is more than or equal to the MSS lower limit value, the protocol stack unit 1022 performs control conforming to a normal TCP communication establishment sequence. In other words, the protocol stack unit 1022 compares the MSS of the communication apparatus 200 and the MSS presented by the counterpart communication apparatus, and performs control to establish a TCP communication using the smaller MSS.

Referring back to the description of FIG. 6, in step S203, the MSS control unit 1040 performs control of registering a rule for rejecting communication requiring an MSS less than the MSS lower limit value at the time of reception, in the packet filtering unit 1021. The packet filtering unit 1021 typically provides a function called a firewall, and provides a function of permitting or rejecting communication, based on the designated rule. In the present exemplary embodiment, a case where iptables is adopted as internal implementation of the packet filtering unit 1021 will be described as a specific example. In a case where the MSS lower limit value acquired in step S200 is "500", the MSS control unit 1040 issues a command illustrated in FIG. 7 to the packet filtering unit 1021 of the OS 1020. This command indicates addition of a rule (policy) for rejecting a packet that is transmitted from a communication partner at establishing a TCP connection and designates 1 to 499 as an MSS. The packet filtering unit 1021 updates a filtering table based on the command.

The packet filtering unit 1021 controls permission and rejection of communication, based on the updated filtering table. Thus, in the communication apparatus 200, the TCP communication with a communication partner apparatus presenting an MSS less than the MSS lower limit value (e.g., an MSS smaller than 500) can be uniformly prohibited.

Figure 8:
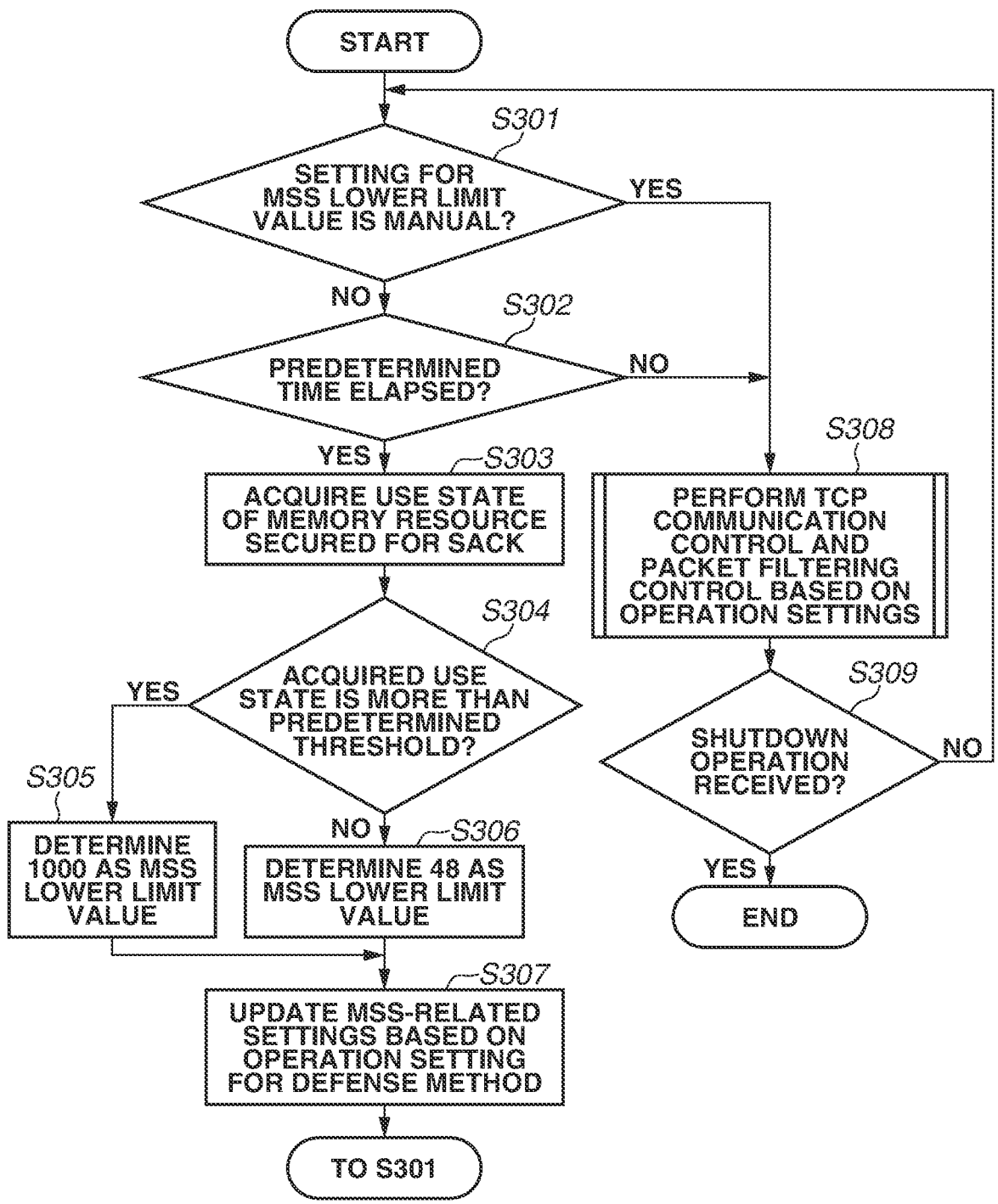
FIG. 8 is a flowchart illustrating an example of control of the communication apparatus.
Figure 9:
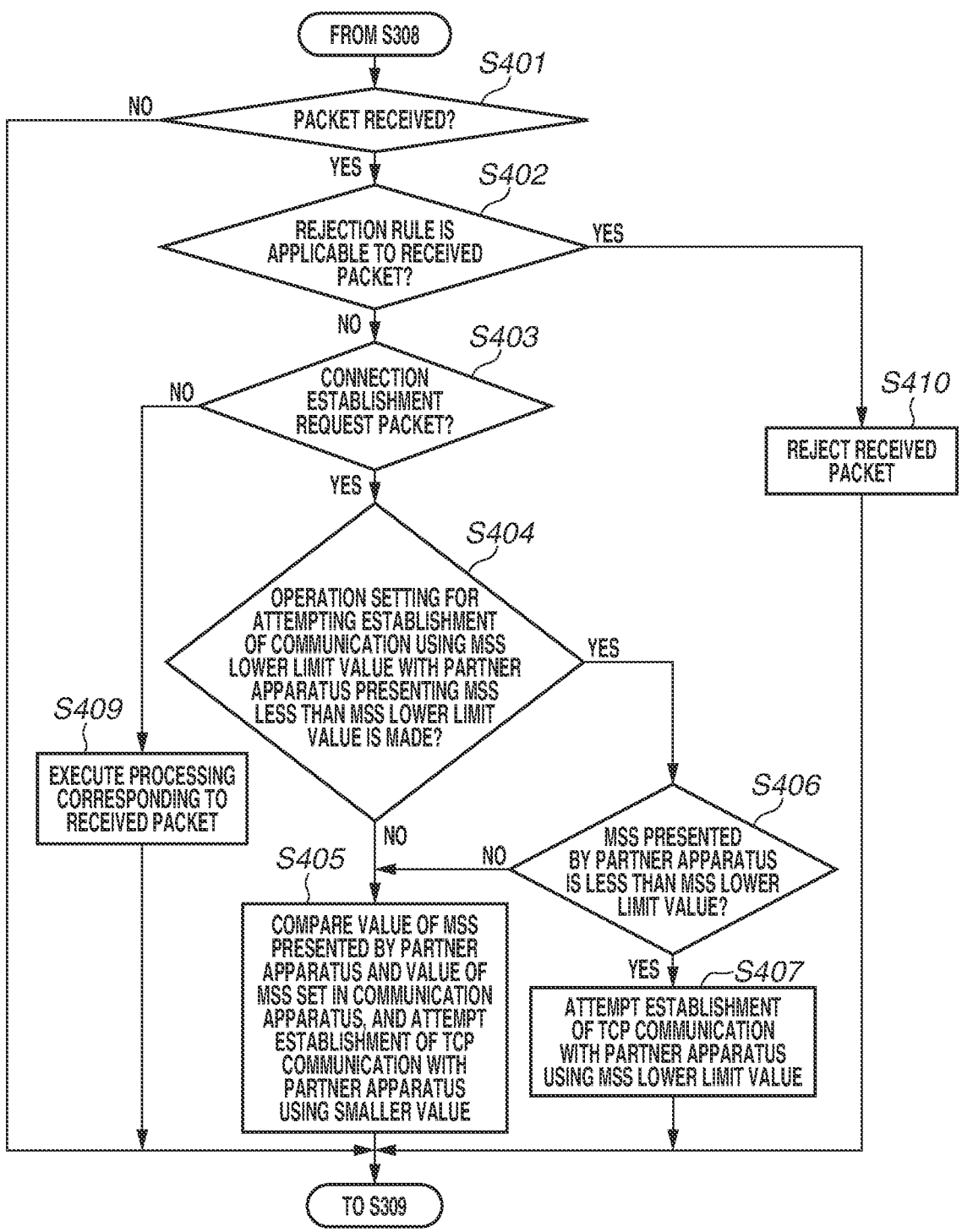
FIG. 9 is a flowchart illustrating an example of control of the communication apparatus.

Next, communication control in the communication apparatus 200 will be described with reference to the flowchart in each of FIG. 8 and FIG. 9. Execution of each step of processing illustrated in the flowchart in FIG. 8 is repeated in a case where the communication apparatus 200 provides a function to the user in a normal mode.

In step S301, the MSS control unit 1040 determines whether the operation setting indicating the way of determining the MSS lower limit value is the manual setting. In a case where the operation setting indicating the way of determining the MSS lower limit value is the manual setting (YES in step S301), the processing proceeds to step S308. In a case where the operation setting indicating the way of determining the MSS lower limit value is the automatic setting (NO in step S301), the processing proceeds to step S302.

In step S302, the MSS control unit 1040 determines whether a predetermined time corresponding to a polling interval has elapsed, in cooperation with the OS 1020. For example, 30 seconds can be adopted as the polling interval for confirming a resource use status. In a case where the MSS control unit 1040 determines that the predetermined time has elapsed (YES in step S302), the processing proceeds to step S303. In a case where the MSS control unit 1040 determines that the predetermined time has not elapsed (NO in step S302), the processing proceeds to step S308.

In step S303, the MSS control unit 1040 issues a check request for checking a resource use state to the MSS lower limit value automatic setting unit 1050. Upon receiving the check request, the MSS lower limit value automatic setting unit 1050 acquires the use state of a data reception memory resource of the protocol stack unit 1022, in cooperation with the OS 1020. Specifically, a use state of a memory resource secured for selective acknowledgement (SACK) is acquired.

In step S304, the MSS lower limit value automatic setting unit 1050 determines whether the use state acquired in step S303 is more than a predetermined threshold. In a case where the use state is more than the predetermined threshold (YES in step S304), the processing proceeds to step S305. In a case where the use state is not more than the predetermined threshold (NO in step S304), the processing proceeds to step S306.

In step S305, the MSS lower limit value automatic setting unit 1050 determines to set 1000 as the MSS lower limit value. On the other hand, in step S306, the MSS lower limit value automatic setting unit 1050 determines to set 48 as the MSS lower limit value. For example, an attack exploiting the vulnerability of CAT-2019-11478 is carried out by transmitting a packet processed to fragment a re-transfer queue that is a memory resource secured for SACK. Therefore, in the present exemplary embodiment, the lower limit value is controlled to be automatically raised in step S305 in a case where the memory resource secured for SACK is excessively used. This processing can prevent occurrence of a further attack exploiting the vulnerability, whereby an increase in processing load in the communication apparatus 200 can be prevented. The communication apparatus 200 may be configured to perform processing for resetting a TCP communication already established with an external apparatus, in a case where the MSS lower limit value is changed to 1000 in step S305.

In step S307, the MSS lower limit value automatic setting unit 1050 executes processing for updating the MSS-related settings, in cooperation with the MSS control unit 1040 and the OS 1020. First, the MSS lower limit value automatic setting unit 1050 notifies the MSS control unit 1040 of the lower limit value determined in step S305 or S306, as a result of the check request. Upon receiving the result of of the check request, the MSS control unit 1040 updates the MSS lower limit value in the setting value DB 1011. Subsequently, the MSS control unit 1040 performs the setting change control described with reference to step S200 to step S203 of the flowchart in FIG. 6, in cooperation with the OS 1020. This processing can dynamically change the communication operation of the protocol stack unit 1022 or the packet filtering unit 1021, depending on the resource use state.

In step S308, the OS 1020 performs communication control for TCP communication and packet filtering control, based on the operation settings. The communication control and the packet filtering control will be described with reference to FIG. 9.

In step S401, the OS 1020 determines whether a packet is received. In a case where a packet is received (YES in step S401), the processing proceeds to step S402. In a case where a packet is not received (NO in step S401), the processing proceeds to step S309.

In step S102, the packet filtering unit 1021 determines whether the rejection rule is applicable to the received packet. In a case where the rejection rule is applicable to the received packet (YES in step S402), the processing proceeds to step S410. In a case where the rejection rule is not applicable to the received packet (NO in step S102), the packet filtering unit 1021 transfers the received packet to the protocol stack unit 1022, and the processing proceeds to step S403. In a case where the rejection rule illustrated in FIG. 7 is registered in a filtering rule, the packet filtering unit 1021 determines that the rejection rule is applicable to a connection establishment request for connection using an MSS less than the MSS lower limit value. In a case where the rejection rule illustrated in FIG. 7 is not registered in the filtering rule, the packet filtering unit 1021 determines that the rejection rule is not applicable to a connection establishment request for connection using an MSS less than the MSS lower limit value.

In step S410, the packet filtering unit 1021 rejects the received packet and the processing proceeds to step S309.

In step S403, the protocol stack unit 1022 determines whether the received packet is a connection establishment request packet. In a case where the protocol stack unit 1022 determines that the received packet is a connection establishment request packet (YES in step S403), the processing proceeds to step S404. In a case where the protocol stack unit 1022 determines that the received packet is not a connection establishment request packet (NO in step S403), the processing proceeds to step S409.

In step S409, the OS 1020 and an application (not illustrated) execute processing corresponding to the received packet. Upon completion of the processing corresponding to the received packet, the processing proceeds to step S309. For example, in a case where a series of packets related to print data is received, print processing based on the print data included in the packets is performed. In a case where the communication apparatus 200 has a web server function and has received a Hypertext Transfer Protocol (HTTP) request packet, the communication apparatus 200 performs processing for providing web data corresponding to the HTTP request.

In step S404, the protocol stack unit 1022 determines whether the operation setting for attempting establishment of communication using the MSS lower limit value with a partner apparatus presenting an MSS less than the MSS lower limit value is set, by referring to the setting value DB 1011. In a case where the operation setting for attempting establishment of communication using the MSS lower limit value with a partner apparatus presenting an MSS less than the MSS lower limit value is set (YES in step S404), the processing proceeds to step S406. In a case where the operation setting for attempting establishment of communication using the MSS lower limit value with a partner apparatus presenting an MSS less than the MSS lower limit value is not set (NO in step S404), the processing proceeds to step S405.

In step S405, the protocol stack unit 1022 compares the value of the MSS included in the connection establishment (initiation) request and presented by the partner apparatus, and the value (e.g., 1460 bytes) of the MSS set in the communication apparatus 200. Subsequently, the protocol stack unit 1022 attempts establishment of TCP communication with the partner apparatus using a value determined to be smaller as the result of the comparison.

In step S406, the protocol stack unit 1022 acquires the value of the MSS lower limit value, by referring to the setting value DB 1011. Subsequently, the protocol stack unit 1022 determines whether the value of the MSS included in the connection establishment request and presented by the partner apparatus is less than the acquired MSS lower limit value. In a case where the value of the MSS presented by the partner apparatus is less than the acquired MSS lower limit value (YES in step S406), the processing proceeds to step S407. In a case where the value of the MSS presented by the partner apparatus is more than or equal to the acquired MSS lower limit value (NO in step S406), the processing proceeds to step S405.

In step S407, the protocol stack unit 1022 attempts establishment of TCP communication with the partner apparatus using the MSS lower limn value acquired in step S406. The communication control based on the operation setting can be performed by executing the processing described with reference to FIG. 9.

Referring back to the description of FIG. 8, in step S309, the OS 1020 determines whether a shutdown operation is received. Specifically, in a case where an operation for shutdown is performed via the control panel 211, i.e., in a case where a hardware power button or a power key of the communication apparatus 200 is pressed, the OS 1020 determines that the shutdown operation is received. In a case where the shutdown operation is not received (NO in step S309), the processing returns to step S301 to repeat the communication control and the resource check processing. In a case where the shutdown operation is received (YES in in step S309), the OS 1020 performs shutdown control and the series of steps of control ends.

A mechanism that can appropriately set the MSS lower limit value in accordance with a user environment for using the communication apparatus via the setting screen for setting the MSS lower limit value can be provided by performing the above-described processing.

In the first exemplary embodiment, the control for protecting the communication apparatus 200 in a case where an attack exploiting the vulnerability is carried out is described. A second exemplary embodiment provides a mechanism that can issue an alert notification indicating that a possibility that an attack exploiting the vulnerability is underway, in addition to performing the control described in the first exemplary embodiment. A hardware configuration in the second exemplary embodiment is similar to that in the first exemplary embodiment and thus the description thereof will be omitted.

Figure 10:
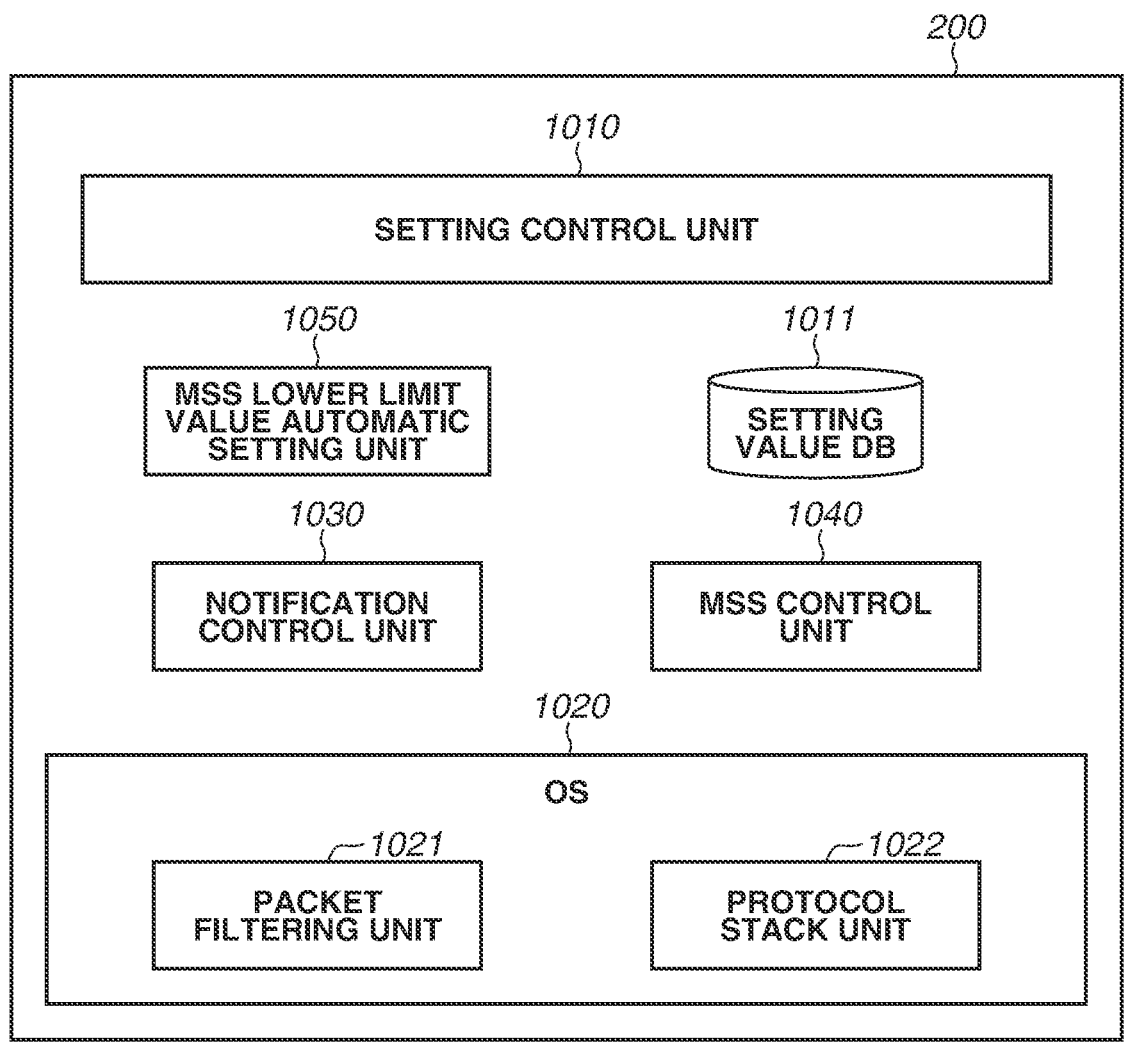
FIG. 10 is a diagram illustrating an example of a software configuration of a communication apparatus according to a second exemplary embodiment.

The specific description is as follows. FIG. 10 is a diagram illustrating a software configuration in the second exemplary embodiment. A point different from the configuration described in the first exemplary embodiment is that a notification control unit 1030 is included. The notification control unit 1030 has a function of adding a rule for outputting a log about a packet satisfying a predetermined condition to the packet filtering unit 1021, and a function of analyzing the log and notifying an alert in a case where a packet log satisfying the predetermined condition is present.

Next, an operation setting related to the notification control unit 1030 will be described with reference to FIG. 11.

A setting screen illustrated in FIG. 11 is an example of a setting screen displayed on the control panel 211 by the setting control unit 1010. This screen is a screen displayed in place of the screen illustrated in FIG. 4A in the first exemplary embodiment. The description of display items similar to those in the first exemplary embodiment will be omitted. The setting screen in FIG. 11 is different from the setting screen illustrated in FIG. 4A in that a setting item related to the alert notification is included.

The screen in FIG. 11 includes a label indicating a setting item including information indicating "notify alert when communication using out-of-range MSS is attempted", and keys 2030 and 2031.

The key 2030 is a display item for selecting whether to notify occurrence of out-of-range MSS communication using an MSS less than the MSS lower limit value in a case where the communication is detected. One of the keys 2030 and 2031 is enabled and the other is disabled. In the present exemplary embodiment, a case where the key 2031 is enabled is described as an example. Each setting made via the screen in FIG. 11 is stored in the setting value DB 1011 and referred to as appropriate in a flowchart to be described below.

The communication apparatus 200 provides a mechanism of performing notification processing in a case where this setting is enabled. Specific control will be described with reference to FIGS. 12A to 12C.

FIG. 12A is a flowchart illustrating each step of processing to be executed in a case where a change is made to the MSS-related settings illustrated in FIG. 11, in a case where the communication apparatus 200 is powered on, in a case where a NW setting is changed, and in a case where the communication apparatus 200 returns from a sleep state. A flowchart illustrated in FIG. 12B is an example of a flowchart illustrating processing of recording a log when communication control is performed. A flowchart illustrated in FIG. 12C is a flowchart illustrating each step of processing repeatedly executed by the notification control unit 1030 in a case where the communication apparatus 200 provides a function to a user in a normal mode. The processing of the flowchart in FIG. 12B and the processing of the flowchart in FIG. 12C are executed in parallel.

First, the operation setting will be described with reference to FIG. 12A. In step S501, the notification control unit 1030 determines whether the operation setting for notifying a communication alert is made, by referring to the setting value DB 1011. In a case where the operation setting for notifying a communication alert is made (YES in step S501), the processing proceeds to step S502. Otherwise (NO in step S501), the series of steps of processing ends.

In step S502, the notification control unit 1030 sets a rule for acquiring a log of communication using an MSS less than the MSS lower limit value acquired in step S200, in the packet filtering unit 1021. For example, in a case where the MSS lower limit value stored in the setting value DB 1011 is "500", the MSS control unit 1040 issues a command illustrated in FIG. 13 to the packet filtering unit 1021 of the OS 1020. This command indicates that a packet transmitted from a communication partner at establishment of connection using a TCP communication and designating any of 1 to 499 as an MSS is to be written in a log file. The packet filtering unit 1021 updates a filtering table, based on the command. Thus, in a case where a communication using an out-of-range MSS is attempted, a log indicating occurrence of this attempt can be stored.

Storing the log will be described with reference to FIG. 12B. FIG. 12B illustrates processing performed by the packet filtering unit 1021, in addition to each step of the processing in the flowchart in FIG. 9 described in the first exemplary embodiment. In the second exemplary embodiment, step S511 is executed in a case where a packet is determined to be received in step S401 in FIG. 9. In step S511, the packet filtering unit 1021 determines whether a log output rule is applicable to the received packet. In a case where the log output rule is applicable to the received packet (YES in step S511), the processing proceeds to step S512. In a case where the log output rule is not applicable to the received packet (NO in step S511), whether the rejection rule is applicable to the received packet is determined (in step S402 in FIG. 9) as described in the first exemplary embodiment.

In step S512, the packet filtering unit 1021 records the log about the received packet in a predetermined storage area, in cooperation with a system log daemon provided by the OS 1020. This log is referred to as appropriate in each step of the processing in the flowchart illustrated in FIG. 12C to be described below. When recording the log is completed, step S402 and thereafter in FIG. 9 are executed.

Finally, a mechanism of performing log monitoring and alert notification will be described with reference to FIG. 12C. In step S521, the notification control unit 1030 determines whether a predetermined time corresponding to a polling interval has elapsed, in cooperation with the OS 1020. For example, 5 minutes can be adopted as the polling interval for confirming a resource use status. In a case where the notification control unit 1030 determines that the predetermined time has elapsed (YES in step S521), the processing proceeds to step S522. In a case where the notification control unit 1030 determines that the predetermined time has not elapsed (NO in step S521), the notification control unit 1030 waits for the predetermined time to elapse.

In step S522, the notification control unit 1030 refers to a log file (log data) generated by the packet filtering unit 1021. Subsequently, the notification control unit 1030 determines whether a log indicating an attempt to communicate using an MSS less than the MSS lower limit value is left in the log file. In a case where a log indicating an attempt to communicate using an MSS less than the MSS lower limit value is left (YES in step S522), the processing proceeds to step S523. In a case where a log indicating an attempt to communicate using an MSS less than the MSS lower limit value is not left (NO in step S522), the processing proceeds to step S524. Specifically, in a case where the polling interval is set to 5 minutes, the notification control unit 1030 acquires the current time from the OS 1020, and extracts log information before a lapse of 5 minutes from the acquired current time. Subsequently, the notification control unit 1030 determines whether a log indicating an attempt to communicate using an MSS less than the MSS lower limit value is left in the extracted log.

In step S523, the notification control unit 1030 notifies the user of a communication alert, in cooperation with the control panel 211. A screen 2300 in FIG. 14 exemplifies a case where a notification is displayed in a status notification area 2310 in a lower part on the control panel 211 included in the communication apparatus 200. The user can recognize a possibility of an attack being underway, by a message 2311 displayed in the status notification area 2310.

This notification method is an example, and for example, in a case where an apparatus such as a PC is used, notification using a notification banner, such as a toast, may be performed. Further, for example, in a case where an apparatus such as a smartphone is used, a notification may be issued to be displayed in a notification area, using a notification function of the OS 1020.

Furthermore, the notification method is not limited to display. For example, it is possible to provide such a configuration that a notification destination e-mail address for notifying an event occurring in the communication apparatus 200 is registered beforehand in the communication apparatus 200, and a communication alert is notified to this notification destination e-mail address.

In a case where the communication apparatus 200 is managed by an administration server, the communication alert can also be notified to the administration server. Specifically, in a case where the communication apparatus 200 is managed with a directory service, such as Active Director (registered trademark), the communication alert can be notified to a server providing this directory service. These notifications enable an information technology (IT) manager or a network administrator who comprehensively manages the communication apparatus 200 to be notified of a possibility that an attack is underway.

Referring back to the description of FIG. 12C, in step S524, the OS 1020 determines whether a shutdown operation is received. This control is similar to step S309 described with reference to FIG. 8. In a case where the shutdown operation is received (YES in step S524), shutdown processing is executed and the series of steps of processing ends. In a case where the shutdown operation is not received (NO in step S524), the processing returns to step S521 to repeat the processing of log monitoring.

The alert notification for notifying the possibility that an attack exploiting the vulnerability is underway can be performed by the above-described processing.

Modification

In each of the first and second exemplary embodiments, the case where the MSS lower limit value can be changed based on the user operation as illustrated to FIG. 4A is described as an example. However, the exemplary embodiments of the present disclosure are not limited thereto. For example, a modification can be made as appropriate to provide such a configuration that the lower limit of the maximum transmission unit (MTU) indicating the maximum datagram of Ethernet can be changed by a user operation. In this case, the setting control unit 1010 may be configured to store a value determined by subtracting a size of 40 bytes that is the size of an IP header and a TCP header from the received MTU lower limit value input by the user operation, into the setting value DB 1011, as the MSS lower limit value.

According to an aspect of the present disclosure, it is possible to provide a mechanism in which a lower limit value can be appropriately set based on a user environment for using a communication apparatus, via a setting screen for setting a lower limit value related to TCP communication.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While, the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-143831, filed Aug. 27, 2020, which is hereby incorporated by reference herein in its entirety.

What is claimed is:

1. A communication apparatus that performs Transmission Control Protocol (TCP) communication with an external apparatus, the communication apparatus comprising:
at least one memory that stores a set of instructions; and
at least one processor that executes the instructions, the instructions, when executed, causing the communication apparatus to perform operations comprising:
setting a maximum segment size (MSS) lower limit value to be used in the TCP communication, based on a user operation;
executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and
executing, when an initiation request for the TCP communication is received from the external apparatus, and in a case where the MSS candidate value received from the external apparatus and acceptable by the external apparatus is less than the set MSS lower limit value, control to avoid establishment of the TCP communication with the external apparatus.

2. A method for controlling a communication apparatus that performs Transmission Control Protocol (TCP) communication with an external apparatus, the method comprising:
setting a maximum segment size (MSS) lower limit value to be used in the TCP communication, based on a user operation;
executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and
executing, when an initiation request for the TCP communication is received from the external apparatus, and in a case where the MSS candidate value received from the external apparatus and acceptable by the external apparatus is less than the set MSS lower limit value, control to avoid establishment of the TCP communication with the external apparatus.

3. The method according to claim 2, wherein the control to avoid establishment of the TCP communication is executed by rejecting the initiation request including the MSS candidate value less than the MSS lower limit value, using a packet filtering function.

4. The method according to claim 2, wherein the communication apparatus is a printing apparatus.

5. The method according to claim 2, the method further comprising
displaying a setting screen for setting the MSS lower limit value,
wherein the setting screen includes at least a display item for receiving input of the MSS lower limit value, and information indicating an input possible range for the MSS lower limit value.

6. The method according to claim 2, the method further comprising providing, when an initiation request for the TCP communication is received from the external apparatus, and in a case where the MSS candidate value received from the external apparatus and acceptable by the external apparatus is less than the set MSS lower limit value, a predetermined notification to a user.

7. A non-transitory computer readable storage medium storing a program for causing a computer to execute a method for controlling a communication apparatus that performs Transmission Control Protocol (TCP) communication with an external apparatus, the method comprising:
setting a maximum segment size (MSS) lower limit value to be used in the TCP communication, based on a user operation;
executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and executing, when an initiation request for the TCP communication is received from the external apparatus, and in a case where the MSS candidate value received from the external apparatus and acceptable by the external apparatus is less than the set MSS lower limit value, control to avoid establishment of the TCP communication with the external apparatus.

8. A method for controlling a communication apparatus that performs Transmission Control Protocol (TCP) communication with an external apparatus, the method comprising:

setting a maximum segment size (MSS) lower limit value to be used in the TCP communication, based on a user operation;

executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and executing, when an initiation request for the TCP communication is received from the external apparatus, and in a case where the MSS candidate value received from the external apparatus and acceptable by the external apparatus is less than the set MSS lower limit value, control to attempt establishment of the TCP communication with the external apparatus using the set MSS lower limit value, without using the MSS candidate value.

9. The method according to claim 8, wherein the communication apparatus is a printing apparatus.

10. The method according to claim 8, the method further comprising:

displaying a setting screen for setting the MSS lower limit value, wherein the setting screen includes at least a display item for receiving input of the MSS lower limit value, and information indicating an input possible range for the MSS lower limit value.

11. The method according to claim 8, the method further comprising:

providing, when an initiation request for the TCP communication is received from the external apparatus, and in a case where the MSS candidate value received from the external apparatus and acceptable by the external apparatus is less than the set MSS lower limit value, a predetermined notification to a user.

12. A non-transitory computer readable storage medium storing a program for causing a computer to execute a method for controlling a communication apparatus that performs Transmission Control Protocol (TCP) communication with an external apparatus, the method comprising:

setting a maximum segment size (MSS) lower limit value to be used in the TCP communication, based on a user operation;

executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and executing, when an initiation request for the TCP communication is received from the external apparatus, and in a case where the MSS candidate value received from the external apparatus and acceptable by the external apparatus is less than the set MSS lower limit value, control to attempt establishment of the TCP communication with the external apparatus using the set MSS lower limit value, without using the MSS candidate value.

13. A communication apparatus that performs Transmission Control Protocol (TCP) communication with an external apparatus, the communication apparatus comprising:

at least one memory that stores a set of instructions; and at least one processor that executes the instructions, the instructions, when executed, causing the communication apparatus to perform operations comprising:

setting a maximum segment size (MSS) lower limit value to be used in the TCP communication, based on a user operation;

executing, when an initiation request for the TCP communication is received from the external apparatus, and in a case where an MSS candidate value received from the external apparatus and acceptable by the external apparatus is more than or equal to the set MSS lower limit value, control to determine the MSS candidate value or the MSS lower limit value set in the communication apparatus, whichever smaller in value, as an MSS to be used in the TCP communication, and establish the TCP communication with the external apparatus using the determined MSS; and executing, when an initiation request for the TCP communication is received from the external apparatus, and in a case where the MSS candidate value received from the external apparatus and acceptable by the external apparatus is less than the set MSS lower limit value, control to attempt establishment of the TCP communication with the external apparatus using the set MSS lower limit value, without using the MSS candidate value.

* * * * *